United States Patent
Chao et al.

(10) Patent No.: US 8,266,167 B2
(45) Date of Patent: Sep. 11, 2012

(54) SYSTEM AND METHOD FOR SCENERIO BASED CONTENT DELIVERY

(75) Inventors: Min-Hung Chao, Los Angeles, CA (US); Dickson Wu, Alhambra, CA (US)

(73) Assignee: Yahoo! Inc., Sunnyvale, CA (US)

( * ) Notice: Subject to any disclaimer, the term of this patent is extended or adjusted under 35 U.S.C. 154(b) by 519 days.

(21) Appl. No.: 11/733,576

(22) Filed: Apr. 10, 2007

(65) Prior Publication Data

US 2008/0256462 A1    Oct. 16, 2008

(51) Int. Cl.
*G06F 7/00* (2006.01)
*G06F 17/30* (2006.01)

(52) U.S. Cl. ........................................ 707/758

(58) Field of Classification Search .............. 707/3, 6, 707/758, 999.003, 999.006; 705/14
See application file for complete search history.

(56) References Cited

U.S. PATENT DOCUMENTS

| | | | |
|---|---|---|---|
| 2003/0217333 A1* | 11/2003 | Smith et al. | 715/513 |
| 2004/0093327 A1* | 5/2004 | Anderson et al. | 707/3 |
| 2004/0260767 A1* | 12/2004 | Kedem et al. | 709/203 |
| 2004/0267612 A1* | 12/2004 | Veach | 705/14 |
| 2005/0021397 A1* | 1/2005 | Cui et al. | 705/14 |
| 2006/0020596 A1* | 1/2006 | Liu et al. | 707/6 |
| 2006/0206379 A1* | 9/2006 | Rosenberg | 705/14 |
| 2006/0236258 A1* | 10/2006 | Othmer et al. | 715/774 |
| 2007/0130010 A1* | 6/2007 | Pokonosky | 705/14 |
| 2007/0162328 A1* | 7/2007 | Reich | 705/14 |
| 2008/0097843 A1* | 4/2008 | Menon et al. | 705/14 |
| 2008/0167016 A1* | 7/2008 | Swanburg et al. | 455/414.1 |

* cited by examiner

*Primary Examiner* — Kimberly Wilson
(74) *Attorney, Agent, or Firm* — Seth H. Ostrow; Ostrow Kaufman LLP

(57) ABSTRACT

The present invention is directed towards systems and methods for providing scenario based content responsive to a given client. The method of the present invention comprises receiving a content request from a given client. Characteristics associated with a client from whom the content request is received are then identified. One or more scenarios corresponding to the one or more characteristics associated with the client are subsequently identified and the client is provided with the content associated with the one or more identified scenarios.

27 Claims, 4 Drawing Sheets

SYSTEM AND METHOD FOR SCENERIO BASED CONTENT DELIVERY

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF INVENTION

The invention disclosed herein relates generally to providing content to a user. More specifically, the present invention is directed towards systems and methods for identifying and providing content to a user on the basis of the occurrence of one or more scenarios.

BACKGROUND OF THE INVENTION

The increase in popularity of the Internet has created a new global advertising market replacing billboards and magazines with transistors and HTML. While conventional advertising techniques such as newspapers and magazines themselves narrow the target audience for an advertiser, the Internet by nature does not limit the audience of a particular site.

In the beginning, content provided on the Internet was, for the most part, static content. Advertising content was set by a page author and would remain the same independent of the user viewing the site. As the technology behind the Internet evolved, more dynamic approaches were developed to allow a user to interact with a website and its content. Advertising techniques have evolved into targeted content systems, serving content to a user based on unique information, for example, past history of search terms.

Need exists, however, to provide content using a specific subset of client information. The content provided maintains its generality but is geared towards a specific subset of users. For example, the content provided to users in New York may be substantially different from the content provided to users in Miami, if the content was related to weather conditions in each city. When a user views a page with the scenario based content, the content may be suited for one or more users in a specific region. Continuing the previous example, subject matter such as current weather conditions affect a majority if not all users within a region; thus the content related to a current scenario maximizes an amount of meaningful exposure to content.

SUMMARY OF THE INVENTION

The present invention is directed towards systems and methods for providing scenario based content responsive to a given client. The method of the present invention comprises receiving a content request from a given client and identifying one or more characteristics associated with the client from which the content request is received.

In one embodiment, the characteristics associated with the client may comprise geographical information stored within an Internet protocol (IP) address, thereby supporting location based scenario targeting. In an alternative embodiment, the characteristics associated with the client may comprise client interests, gender, age or profession retrieved from a client profile. In yet a further embodiment, the characteristics associated with a client may include information stored within an HTTP request header.

One or more scenarios are then identified, whereby the scenarios may correspond to the one or more characteristics associated with the client, in addition to other information. In one embodiment, the one or more scenarios comprise content based on a location of the requesting client device. In an alternative embodiment, the one or more scenarios comprise content based on a real-world occurrence or scenario coming to pass. In yet a further embodiment, the scenarios may comprise content based upon the content of the page being requested. Finally, the content associated with the one or more scenarios is returned to the client. In one embodiment the returned content comprises pop-up or pop-under advertisements. In alternative embodiments, the returned content may comprise audio and/or video content.

The present invention is further directed towards a system for providing scenario based content responsive to a given client. The system of the present invention comprises a plurality of client devices operable to request content from a content provider and at least one content provider operable to identify one or more characteristics associated with the client from which the content request is received.

In one embodiment, the characteristics associated with the client may comprise geographical information stored within an Internet protocol (IP) address. In an alternative embodiment, the characteristics associated with the client may comprise client interests, gender, age or profession retrieved from a client profile. In yet a further embodiment, the characteristics associated with a client may include information stored within an HTTP request header.

The system further comprises a network connected to said plurality of client devices and said content provider operable to transmit data between said client devices and said content provider.

A scenario based content provider is further connected to the network operable to identify one or more scenarios, which may correspond to the one or more characteristics associated with the client device. In one embodiment, the one or more scenarios comprise content based on a location of the requesting client device. In an alternative embodiment, the one or more scenarios comprise content based on a clients interests, gender, age or profession. In yet a further embodiment, the scenarios may comprise content based upon the content of the page being requested satisfying a given scenario.

According to one embodiment, the system may comprise at least one content data store operative to provide real-time data to the scenario based content generator. The scenario-based content may be derived from the produced real-time content.

The scenario based content provider is further operable to provide the content associated with one or more identified scenarios. In a one embodiment, the returned content comprises pop-up or pop-under advertisements. In alternative embodiments, the returned content may comprise audio and/or video content.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
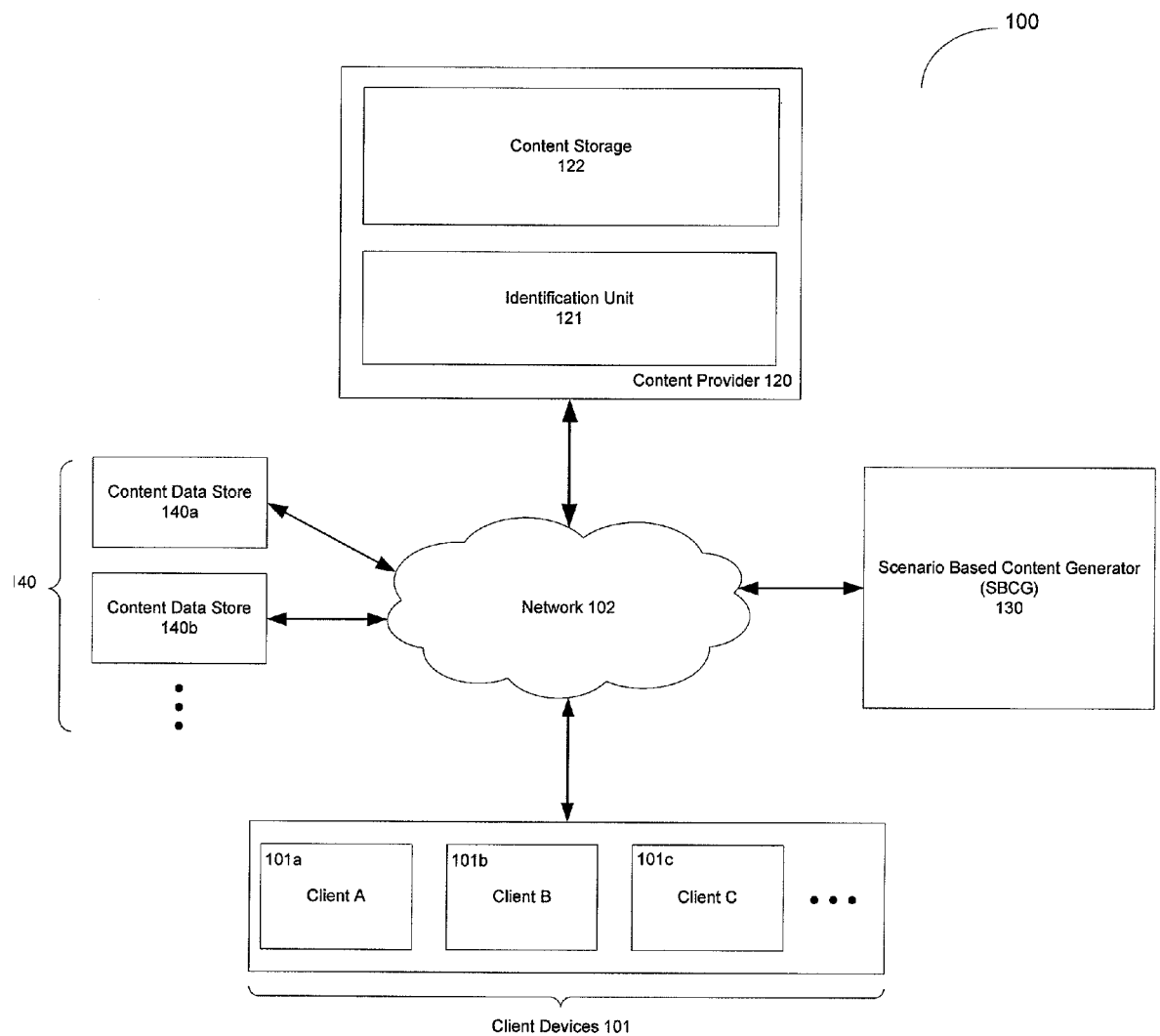
FIG. 1 is a block diagram illustrating one embodiment of a system for providing scenario based content to a one or more clients according to one embodiment of the present invention.

FIG. 1 presents a block diagram depicting one embodiment of a system for generating scenario-based content through the use of client information received by a content provider. According to the embodiment illustrated in FIG. 1, a system 100 for generating scenario-based content comprises a plurality of client devices 101a-c, a content provider 120, a scenario based content generator ("SBCG") 130 and a plurality of content data stores 140a-b coupled to a network 102.

According to the embodiment illustrated in FIG. 1, client devices 101 are communicatively coupled to network 102, which may include a connection to one or more local and wide area networks, such as the Internet. According to one embodiment of the invention, client devices 101a-c are general purpose personal computers comprising a processor, transient and persistent storage devices operable to execute software such as a web browser, peripheral devices (input/output, CD-ROM, USB, etc.) and a network interface. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

Client devices 101a-c are operative to communicate requests to content provider 120 via the network 102. A given request may be in the form of an HTTP request, RTP request, SOAP request, or any network protocol for requesting content as is known to those of skill in the art. In one embodiment, a client 101a may utilize a web browser to request a dynamic web page corresponding to the search results for a requested term.

Content provider 120 is operative to receive a request from one or more client devices 101a-c and to perform the requested action. Although illustrated as a single unit in FIG. 1, content provider 120 may also span a plurality of units, such as a plurality of server systems communicatively connected via a network. Content provider 120 comprises an identification unit 121 and content storage 122. As is recognized by one of ordinary skill in the art, the content provider 120 may comprise of various other units common on a content provider, including but not limited to a traffic analyzer, administrative unit, etc.

Content provider 120 contains an identification unit 121 which is operative to determine an identity for a give client device 101a-c that is requesting a service of the content provider 120. The identification unit 121 may attempt to identify the client 101a-c by locating identification information associated with the client 101a-c (or a user of a given client), such as a user profile. In one embodiment, a client device 101a-c requesting a service may provide information via a cookie passed within an HTTP header as specified in RFC 2965, herein incorporated by reference in its entirety. For example, a client HTTP request may submit a name-value pair stored in a cookie on the client machine within the HTTP request header, such as "Cookie: USERID=exampleUser;". The value "exampleUser" may correspond to a client ID stored by the content provider 120, which may allow the content provider 120 to locate a profile associated with the ID. The identification unit 121 is operative to extract name-value pair information and fetch data from a client profile stored in content storage 122.

Content storage 122 comprises a storage element accessible by identification unit 121. Content storage may be any storage device known to those of skill in the art such as a hard disk, random access memory (RAM), etc. Although illustrated as residing within content provider 120, alternative embodiments may exist wherein content storage 122 exists outside of the content provider 120, such as on another device. A client profile stored within content storage 122 may contain information specific to a given client 101a-c requesting a service of the content provider 120. For example, a client profile may contain the location of a client 101a-c, the gender of the client 101a-c or the interests of the client 101a-c. The preceding contents of the client profile are exemplary in nature, and embodiments may exist wherein the client profile contains other or additional client identification information.

The identification unit 121 retrieves the client identification information from the content storage 122 and the client identification is sent to the scenario based content generator ("SBCG") 130. The SBCG 130 generates scenario-based content using the retrieved client identification information, which may include information regarding the occurrence of a particular scenario, event or series of events.

If a client device 101a-c does not explicitly provide information regarding the client device 101a-c, identification unit 121 may be operative to determine identification information based upon the request that the content provider 120 receives. In a one embodiment, the identification unit 121 may utilize metadata attached or derived from the request from the client device 101a-c. For example, if a client device 101a-c submits a request via HTTP, various parameters may be extracted from the request that allow the identification unit 121 to generate client identification information. In an exemplary embodiment, the Internet Protocol (IP) address of the client device 101a-c requesting services of a content provider 120 may be extracted by the identification unit 121. As known in the art, the IP address of a client device 101a-c roughly approximates the location of a client device 101a-c, and thus may allow the identification unit 121 to determine the location of a client device 101a-c for use by the SBCG 130. Additional information may also be gathered by the identification unit 121 in lieu of or in conjunction with the previous example. Such information may be provided within an HTTP header, such as the referring site, the operating system utilized by a client device 101a-c and/or the browser utilized by the client device 101a-c.

The identification unit 121 may use the derived client information to create a client profile for use by the SBCG 130. The derived profile generated by the identification unit 130 may be of an order of complexity lower than the client profile retrieved from the content storage 122, while providing a broad profile of the client device 101a-c making the request.

In certain circumstances, the identification unit 121 may not be able to create a client profile via a stored client profile or via a derived client profile. In this situation, identification unit 121 may not attempt to create a client profile and alert the SBCG 130 of the absence of a client profile upon its request for content from the SBCG 130, as is described in greater detail herein. The identification unit 121 generates a request to be sent to the SBCG 130 based upon the client profile, or absence of the client profile. This request may be sent across a network 102 to SBCG 130, via any transfer protocol means discussed previously or known to those of skill in the art.

The SBCG 130 receives the request from the identification unit 121 and proceeds to generate scenario based content on the basis of the received request. The scenario based content generated by SBCG 130 represents content that is related to at least the client profile generated by the content provider 120. The SBCG 130 is operative to review the received client profile and generate scenario based content on the basis of a plurality of content data stores 140a-b. Content data stores 140 may represent various sources of data representing different scenarios, such as RSS feeds, region-specific news sources, etc.

For example, the SBCG 130 may receive a request from content provider 120 containing a client profile indicating a user is from New York City, as based on a user profile stored within content storage 122, or derived from the IP address assigned to the client device 101a-c. The SBCG 130 may utilize this client information to check if any additional content, such as advertisements, that is associated with New York based scenarios is available from the plurality of content data stores 140. Content data store 140a may contain real-time information relating to the current weather conditions in New York City, traffic data within the region, or any other data corresponding to the New York City region. The SBCG 130 may select the current weather conditions in New York City as an appropriate scenario base and would proceed to generate content related to the current weather conditions within the client devices' 101a-c region. If the current weather conditions for the New York City region were reported as being at or above a given level, such as 80 degrees Fahrenheit, content relating to the selected scenario base may include advertisements for sunglasses, air conditioning units and/or travel advertisements to cooler regions. The SBCG 130 would then return the scenario-based content to the content provider 120, which in turn may augment or otherwise transform the scenario based content for transmission to a given client device 101.

Figure 2:
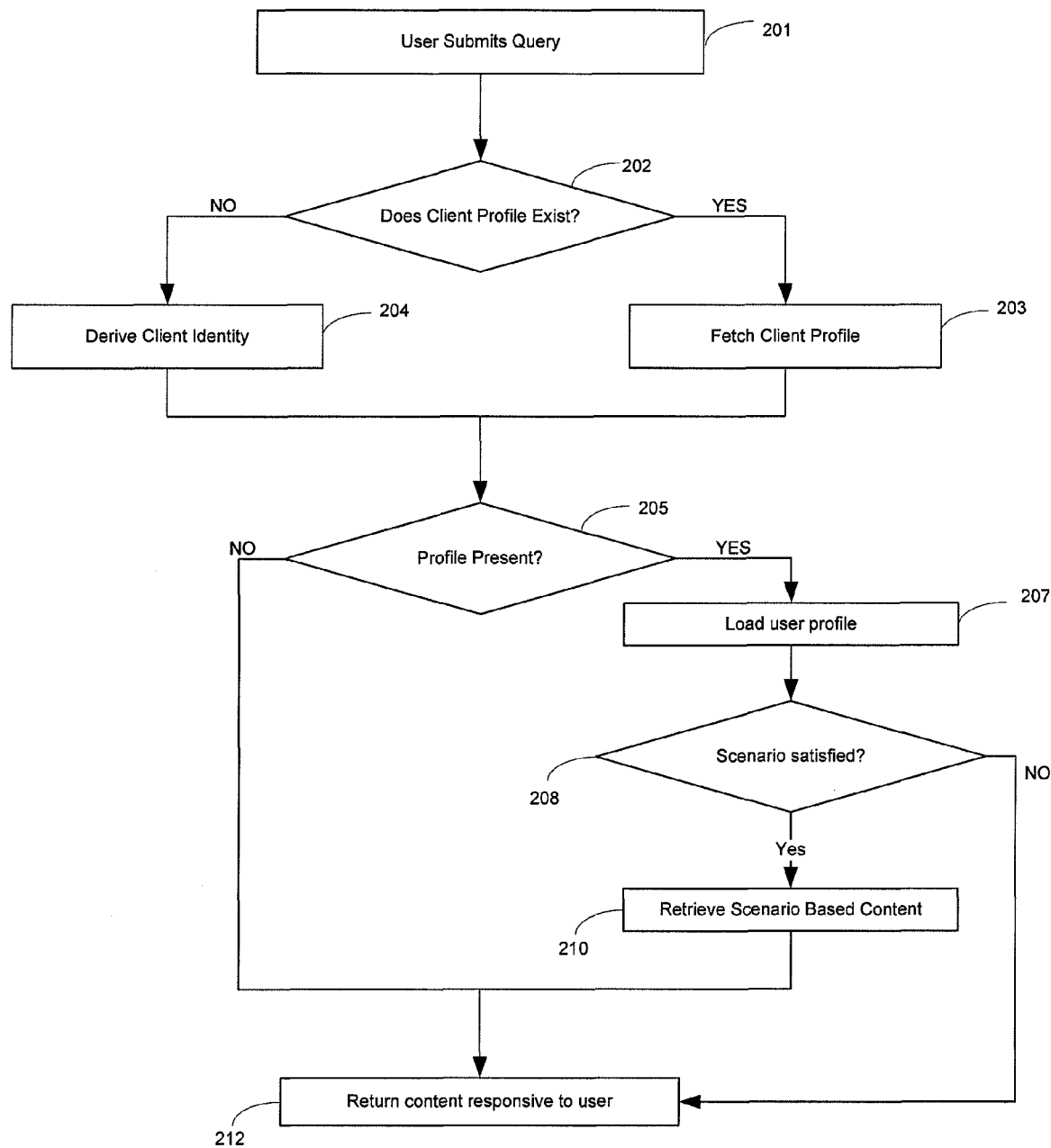
FIG. 2 is a flow diagram illustrating one embodiment of a method for providing scenario based content in response to a client request according to one embodiment of the present invention.

FIG. 2 presents a flow diagram illustrating one embodiment of a method for providing scenario based content in response to a given client request. According to the embodiment illustrated in FIG. 2, a given user of a client device may submit a query, step 201, the query representing a request for content from a content provider. For example, in one embodiment wherein the client device comprises a user utilizing a web browser to load an HTML (or other markup language) search page, a query may comprise submitting a form or any other request known in the art that may be performed through use of a web browser.

Upon receiving a request, a check is performed to determine whether a user profile exists for the client from which the query is received, step 202. As previously described, various methods may be employed to identify a client device. For example, a cookie may be detected in step 202 that identifies a client ID associated with the client request. Alternatively, or in conjunction with the foregoing, a client ID may be passed in a query string in the received request. If a determination is made at step 202 that a client profile exists, the client profile is retrieved, step 203. The client profile may contain, for example, the geographical location of a client, the gender of the client, the interests of the client or one or more client preferences.

If a client profile does not exist for the user from which the query was received, step 202, or if client identification information is not received, a client profile may derived from the request, step 204, which may include other information regarding the client. In one embodiment, metadata attached or derived from the client request may be utilized to create a client profile. For example, if a client device submits a request via HTTP, various parameters may be extracted from the request that allow the identification to generate client identification information. In an exemplary embodiment, the Internet Protocol (IP) address of the client device requesting services of a content provider may be extracted and utilized to derive the client profile.

After a client profile is fetched or derived, a check is performed to determine if the client profile is present, step 205. If it is determined that a client profile was neither fetched nor derived, steps 203 or 204, respectively, the query is processed in according with one or more search techniques know to those of skill in the art, step 212, e.g., algorithmic search, to generate a result set comprising search results that are responsive to the query received in step 201.

If a client profile is detected, step 205, the system loads the user profile and extracts information regarding the client, step 207, e.g., demographic information regarding the client. A check is also performed to determine is a given scenario is satisfied for the presentation for scenario based content, step 208. According to one embodiment, a given scenario is set up by an advertiser to control placement of advertisements in response to satisfaction of a scenario. The scenario also identify advertisement placement parameters for modification in response to the satisfaction of the scenario including modifying the bid that an advertiser agrees to pay for selection of an advertisement (changing the price per click). For example, a given scenario may identify a first condition (Fed interest rate increases) and a second condition (new housing starts down); in response to which an advertiser may lower the price per client that he or she bids for placement of advertisements or placement of advertisements on pages that satisfy the scenario. Accordingly, embodiments of the invention contemplate management of user content in addition to bid management for advertisers.

Where a scenario is satisfied, which may also take into account information regarding the client from the user profile, scenario based content may be retrieved, step 210. After a request is made for the scenario based content, it is returned to the client in conjunction with a result set comprising search results that are responsive to the user query, step 208.

Figure 3:
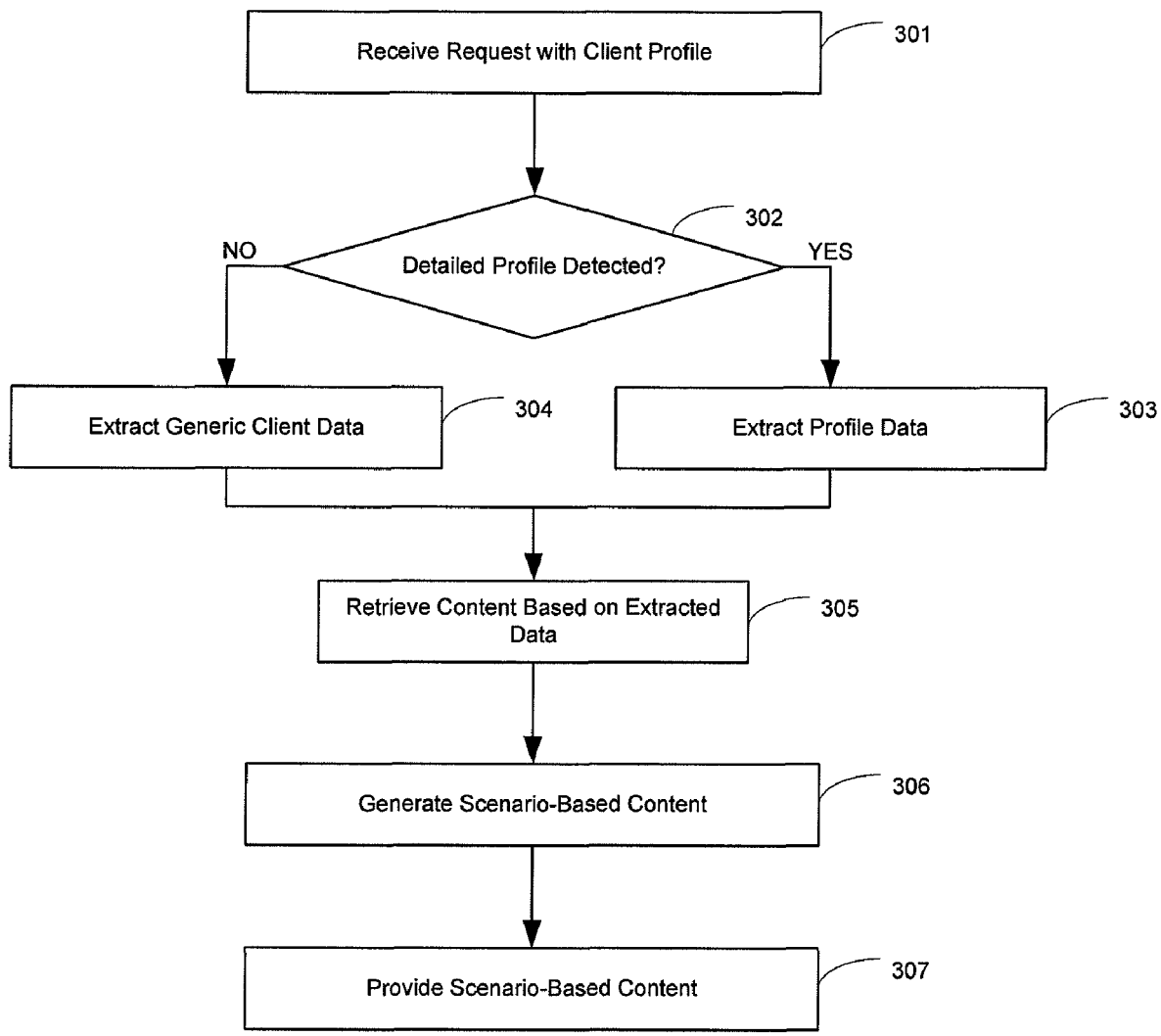
FIGS. 3 and 4 are flow diagrams illustrating varying embodiments of a method for generating scenario based content in response to information received regarding the contents of a requested page.

FIG. 3 illustrates a flow diagram of a method for providing scenario-based content. The method includes receiving a request with a client profile, step 301. Decision step 302 includes determining if a detailed profile is detected. If yes, step 303 is to extract the profile and if not, step 304 is to extract generic client data. Step 305 is to retrieve content based on extracted data. Step 306 is to generate scenario-based content, consistent with techniques described above and step 307 is to provide the scenario based content.

Figure 4:
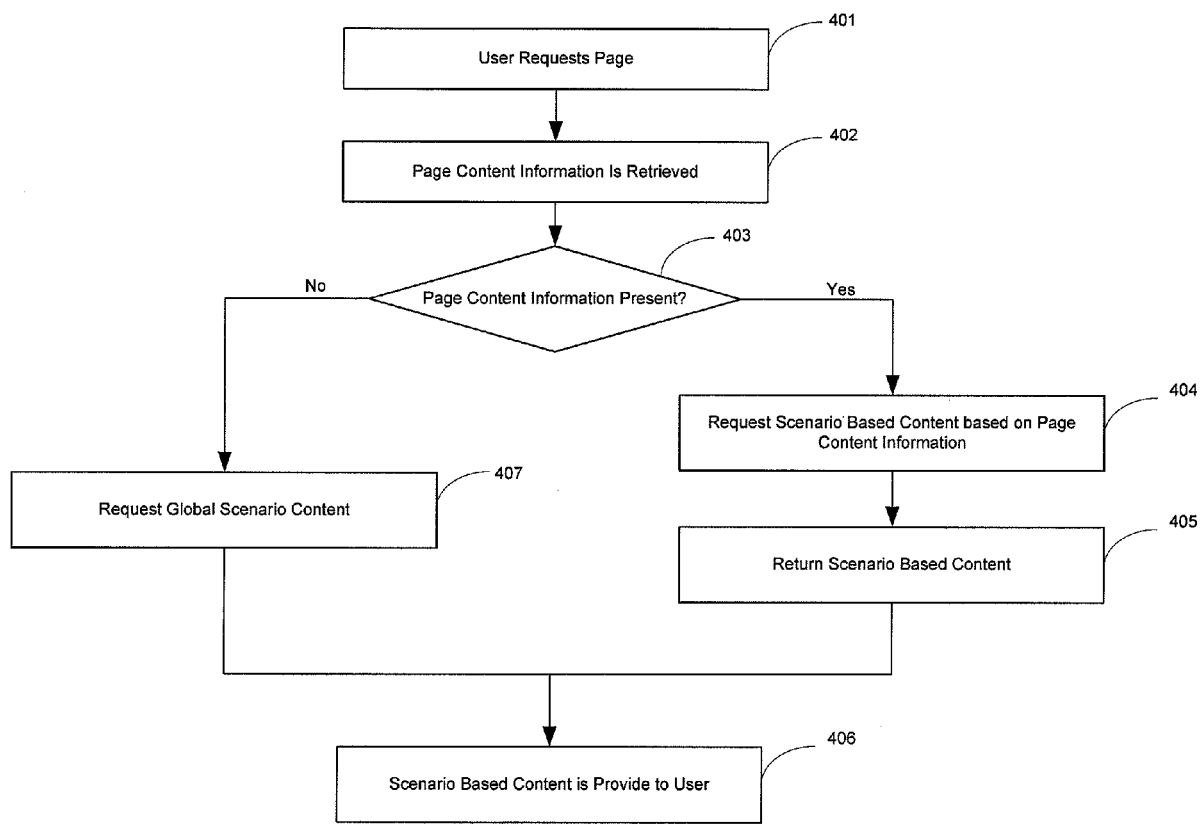

FIG. 4 presents a flow diagram illustrating a method for generating scenario based content in response to information received regarding the contents of a requested page satisfying a scenario. A user requests a content page, step 401. As mentioned previously, a user request may be in the form of an HTTP request, or any other network request known in the art.

Page content information is retrieved in step 402. Page content information corresponds to any information that may be of value in determining the contents of the requested page. For example, the uniform resource locator ("URL") of the page may be utilized to determine the content of the page. That is, a requested webpage having a URL of "http://www-.mta.info/buses/schedules/Brooklyn" may be utilized to determine what the contents of the page are. In this example, it may be determined that the contents include a schedule of Metropolitan Transportation Authority buses in Brooklyn, NY. Alternative embodiments may exist in lieu of or in conjunction with the previous or alternative embodiments. For example, separate tags may be introduced in an HTML or XML document that indicates the content of the page. An example of such a tag is the <META> tag specified by HTML standards.

If page content information is unable to be extracted from the requested page, for example, if the page is unable to be categorized by any of the previously proposed methods, the requested page is returned to the user, step 406. The requested page may be in communication with an advertisement serving system operative to insert one or more advertisements into the content item on the basis of the content contained therein, e.g., content match advertisements.

If page content information exists, a check is performed to determine if scenario based content is available on the basis of the content of the page, which may also comprise accounting for any user specific information, step 404, e.g., location. Where the page content satisfies the scenario, scenario based content is retrieved, step 405. For example, an advertisement provider may provide one or more advertisements relating to an enumerated scenario to an advertisement serving system. Upon the presence of a discussion of the scenario in a given content item, the advertisement may be retrieved as an exemplary item of scenario based content. The scenario based content generated in step 405 may be provided to the user in conjunction with the page that the user is requesting, step 406.

According to one exemplary embodiment, if a user requests a page with the URL of "http://www.mta.info/buses/schedules/Brooklyn" a check for scenario based content is sent, step 404, containing information regarding various combinations of the request, page, client, etc. The information may indicate that the user is looking to travel by bus in Brooklyn near the time of the request. If, for example, inclement weather, such as ice or snow, are causing bus schedules to be delayed or canceled, scenario based content may be generated that alerts the user of the delay and suggests that user utilize the MTA subway system in lieu of the bus system (step 405). This scenario based content is then provided to the user in an informative fashion, such as a pop-up advertisement or other comparable method as known in the art with the page at the requested URL, step 406.

FIGS. 1 through 4 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A system for providing scenario-based content responsive to a given client, the system comprising:
   at least one content provider computing device coupled to at least one client device over a communication network, the at least one content provider computing device configured to receive a content request by a user using the at least one client device within a computing environment, the content provider computing device further configured to identify one or more characteristics associated with the user from which a content request is received; and
   a scenario based content provider configured to:
   identify one or more scenarios corresponding to the one or more characteristics associated with the user and the content request, the one or more scenarios including one or more real-world activities associated with the user in a real-world environment, the real-world environment excluding the computing environment;

determine real-world scenario information relevant to the content request associated with the one or more scenarios, the real-world scenario information corresponding to at least one of news events, weather conditions and traffic data occurring in the real-world environment relating to the user;

determine from the real-world scenario information one or more real-world events occurring in the real-world environment capable of affecting the one or more real-world activities associated with the user;

retrieve scenario-based content associated with the content request and the real-world scenario information based on the one or more real-world events; and provide a recommended real-world activity in response to the content request upon occurrence of the one or more real-world events as an alternative to the one or more real-world activities associated with the user to the client device from which the content request is received, the recommended real-world activity including the retrieved scenario-based content.

2. The system of claim 1 wherein said system further comprises at least one content data store.

3. The system of claim 2 wherein said scenario based content provider is configured to retrieve real-time content from at least one content data store.

4. The system of claim 3, wherein said scenario-based content is derived from the retrieved real-time content.

5. The system of claim 1, wherein said characteristics associated with the user from which the content request is received comprises a geographic location.

6. The system of claim 5, wherein said geographic location is represented by an Internet Protocol address.

7. The system of claim 1, wherein said characteristics associated with the user from which the content request is received comprises user profile information.

8. The system of claim 7, wherein said user profile information comprises at least one of user interests, gender, age and profession.

9. The system of claim 1, wherein said characteristics associated with the user from which the content request is received comprises information stored within a hypertext transfer protocol request header.

10. The system of claim 1, wherein said one or more scenarios comprises content associated with a location of the client device.

11. The system of claim 1, wherein said one or more scenarios comprise content associated with at least one of user interests, gender, age and profession.

12. The system of claim 1, wherein the content associated with the one or more identified scenarios comprises pop under advertisements.

13. The system of claim 1, wherein the content associated with the one or more identified scenarios comprises audio or video content.

14. The system of claim 1, wherein said one or more scenarios comprise content associated with content of a given website page.

15. The system of claim 1, wherein the content associated with one or more identified scenarios comprises pop up advertisements.

16. A method for providing scenario-based content responsive to a given client, the method comprising:

receiving a content request from a given user of the client within a computing environment;

identifying one or more characteristics associated with the user from which the content request is received;

identifying one or more scenarios corresponding to the one or more characteristics associated with the user and the content request, the one or more scenarios including one or more real-world activities associated with the user in a real-world environment, the real-world environment excluding the computing environment;

determining real-world scenario information relevant to the content request associated with the one or more scenarios, the real-world scenario information corresponding to at least one of news events, weather conditions and traffic data occurring in the real-world environment relating to the user;

determining from the real-world scenario information one or more real-world events occurring in the real-world environment capable of affecting the one or more real-world activities associated with the user;

retrieving scenario-based content associated with the content request and the real-world scenario information based on the one or more real-world events; and providing the user with a recommended real-world activity in response to the content request upon occurrence of the one or more real-world events as an alternative to the one or more real-world activities associated with the user, the recommended real-world activity including the retrieved scenario-based content.

17. The method of claim 16, wherein said characteristics associated with the user from which the content request is received comprises a geographic location.

18. The method of claim 17, wherein said geographic location is represented by an Internet Protocol address.

19. The method of claim 16, wherein said characteristics associated with the user from which the content request is received comprises user profile information.

20. The method of claim 19, wherein said user profile information comprises at least one of user interests, gender, age and profession.

21. The method of claim 16, wherein said characteristics associated with the user from which the content request is received comprises information stored within a hypertext transfer protocol request header.

22. The method of claim 16, wherein said one or more scenarios comprises content associated with a location of the client.

23. The method of claim 16, wherein said one or more scenarios comprise content associated with at least one of user interests, gender, age and profession.

24. The method of claim 16, wherein said one or more scenarios comprise content associated with content of a given web page.

25. The method of claim 16, wherein providing the content associated with the one or more identified scenarios comprises providing pop up advertisements.

26. The method of claim 16, wherein providing the content associated with the one or more identified scenarios comprises providing pop under advertisements.

27. The method of claim 16, wherein providing the content associated with the one or more identified scenarios comprises providing audio or video content.

* * * * *